United States Patent
Lai et al.

(10) Patent No.: US 7,963,000 B2
(45) Date of Patent: Jun. 21, 2011

(54) FLIP APPARATUS AND ELECTRONIC DEVICE USING THE SAME

(75) Inventors: Chin-Chung Lai, Taipei (TW); Hung-Chang Hung, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 390 days.

(21) Appl. No.: 12/216,011

(22) Filed: Jun. 27, 2008

(65) Prior Publication Data

US 2009/0016002 A1    Jan. 15, 2009

(30) Foreign Application Priority Data

Jul. 13, 2007    (TW) ................................ 96125532 A

(51) Int. Cl.
  *E05D 3/10* (2006.01)
  *E05D 7/06* (2006.01)
(52) U.S. Cl. ................ 16/367; 16/239; 16/359
(58) Field of Classification Search ............... 016/367, 016/358, 359, 360, 361, 239, 242, 357, 352, 016/353, 362, 364, 319, 324, 326, 349; 361/679.05, 361/679.27, 679.13, 679.56; 455/90.3, 575.1, 455/575.3, 575.8; 379/433.12, 433.13; 348/373, 348/333.01, 333.06, 794
See application file for complete search history.

(56) References Cited

U.S. PATENT DOCUMENTS

| | | | | |
|---|---|---|---|---|
| 2,991,117 A | * | 7/1961 | Tatter | 49/246 |
| 5,548,478 A | * | 8/1996 | Kumar et al. | 361/679.27 |
| 6,798,649 B1 | * | 9/2004 | Olodort et al. | 361/679.13 |
| 7,027,846 B2 | | 4/2006 | Pan | |
| 7,599,487 B2 | * | 10/2009 | Lim | 379/433.12 |
| 2004/0027808 A1 | * | 2/2004 | Rumney | 361/724 |
| 2005/0107119 A1 | * | 5/2005 | Lee et al. | 455/556.1 |
| 2005/0117284 A1 | * | 6/2005 | Kida | 361/681 |
| 2006/0046792 A1 | * | 3/2006 | Hassemer et al. | 455/575.1 |
| 2006/0160584 A1 | * | 7/2006 | Lee et al. | 455/575.4 |
| 2006/0172786 A1 | | 8/2006 | Lo | |
| 2006/0188092 A1 | * | 8/2006 | Pontoppidan et al. | 379/433.13 |
| 2007/0058330 A1 | | 3/2007 | Lin | |
| 2007/0123179 A1 | * | 5/2007 | Lim | 455/90.3 |
| 2008/0189908 A1 | * | 8/2008 | Lowry et al. | 16/231 |
| 2008/0307607 A1 | * | 12/2008 | Kim et al. | 16/330 |

FOREIGN PATENT DOCUMENTS

TW    200710635 A    3/2007

* cited by examiner

*Primary Examiner* — Chuck Y. Mah

(57) ABSTRACT

A flip apparatus and an electronic device using the same are provided. The flip apparatus is disposed in the electronic device including a first casing and a second casing. The flip apparatus includes a sliding mechanism, a rotating mechanism pivotally connected to the second casing, and an actuating element disposed at the second casing. The sliding mechanism is disposed at the first casing and is slidably connected to the second casing to drive the first casing to slide to a rotating position relative to the second casing. The rotating mechanism includes a rotating block pivotally connected to the second casing and fixed to the first casing, a moving block slidably provided at the rotating block and is fixed to the sliding mechanism, and an elastic element coupled to the rotating block and has elastic potential energy. The rotating block can be driven to rotate by releasing the elastic potential energy.

20 Claims, 8 Drawing Sheets

US 7,963,000 B2

FLIP APPARATUS AND ELECTRONIC DEVICE USING THE SAME

This application claims the benefit of Taiwan application Serial No. 96125532, filed Jul. 13, 2007, the subject matter of which is incorporated herein by reference.

BACKGROUND OF THE INVENTION

1. Field of the Invention

The invention relates to a flip apparatus and an electronic device using the same and, more particularly, to a flip apparatus allowing a first casing to rotate and slide relative to a second casing and an electronic device using the same.

2. Description of the Related Art

Please refer to FIG. 1A which is a schematic diagram showing a conventional electronic device. The electronic device 100 includes a first casing 101, a second casing 102, a display screen 103, and at least one rotating shaft 104. The display screen 103 is provided at the first casing 101. The first casing 101 and the second casing 102 are respectively coupled to the rotating shaft 104. The first casing 101 rotates relative to the second casing 102 by the rotating shaft 104. Thus a user can view the display screen 103.

Please refer to FIG. 1B which is a schematic diagram showing another conventional electronic device. The electronic device 150 includes a first casing 151, a second casing 152, a display screen 153, a sliding element 154, and a keyboard 155. The display screen 153 is provided at the first casing 151. The sliding element 154 is provided between the first casing 151 and the second casing 152. The first casing 151 slides relative to the second casing 152 by the sliding element 154. Thus the user can view the display screen 153 and use the keyboard 155 at the same time.

However, the first casing 101 of the electronic device 100 in FIG. 1A only can rotate relative to the second casing 102. The first casing 151 of the electronic device 150 in FIG. 1B only can slide relative to the second casing 152. Neither the electronic device 100 nor the electronic device 150 has two operation modes of rotating and sliding, and therefore they fail to facilitate the use.

BRIEF SUMMARY OF THE INVENTION

The invention provides a flip apparatus and an electronic device where a sliding mechanism and a rotating mechanism cooperate to allow a first casing to slide and rotate relative to a second casing.

According to the invention, a flip apparatus is provided. The flip apparatus is disposed in an electronic device. The electronic device includes a first casing and a second casing. The flip apparatus includes a sliding mechanism, a rotating mechanism, and an actuating element. The sliding mechanism is disposed at the first casing and is slidably connected to the second casing to drive the first casing to slide to a rotating position relative to the second casing. The rotating mechanism is pivotally connected to the second casing. The rotating mechanism includes a rotating block, a moving block, and an elastic element. The rotating block is pivotally connected to the second casing and is fixed to the first casing. The moving block is slidably provided at the rotating block and is fixed to the sliding mechanism. The elastic element is pivotally connected to the rotating block. The elastic element has elastic potential energy and the rotating block can be driven to rotate by releasing the elastic potential energy. The actuating element is disposed at the second casing and is used for restricting the rotating mechanism. When the first casing slides relative to the second casing to the rotating position, the actuating element can release the rotating mechanism to release the elastic potential energy of the elastic element, and then the rotating block is driven to rotate and the moving block is driven to slide relative to the rotating block thus to drive the first casing to rotate relative to the second casing.

According to the invention, an electronic device is provided. The electronic device includes a first casing, a second casing, and a flip apparatus. The flip apparatus includes a sliding mechanism, a rotating mechanism, and an actuating element. The sliding mechanism is disposed at the first casing and is slidably connected to the second casing to drive the first casing to slide to a rotating position relative to the second casing. The rotating mechanism is pivotally connected to the second casing. The rotating mechanism includes a rotating block, a moving block, and an elastic element. The rotating block is pivotally connected to the second casing and is fixed to the first casing. The moving block is slidably provided at the rotating block and is fixed to the sliding mechanism. The elastic element is pivotally connected to the rotating block. The elastic element has elastic potential energy and the rotating block can be driven to rotate by releasing the elastic potential energy. The actuating element is disposed at the second casing and is used for restricting the rotating mechanism. When the first casing slides to the rotating position relative to the second casing, the actuating element can release the rotating mechanism to release the elastic potential energy of the elastic element, and then the rotating block is driven to rotate and the moving block is driven to slide relative to the rotating block thus to drive the first casing to rotate relative to the second casing.

These and other features, aspects, and advantages of the present invention will become better understood with regard to the following description, appended claims, and accompanying drawings.

DETAILED DESCRIPTION OF THE EMBODIMENTS

Figure 1A:
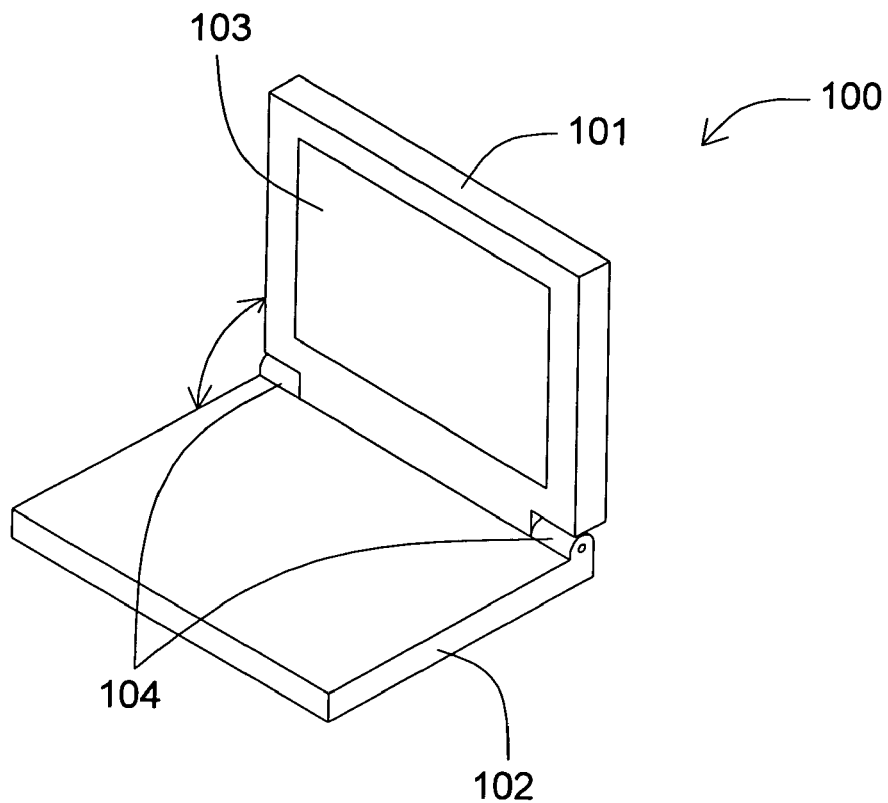
FIG. 1A is a schematic diagram showing a conventional electronic device.
Figure 1B:
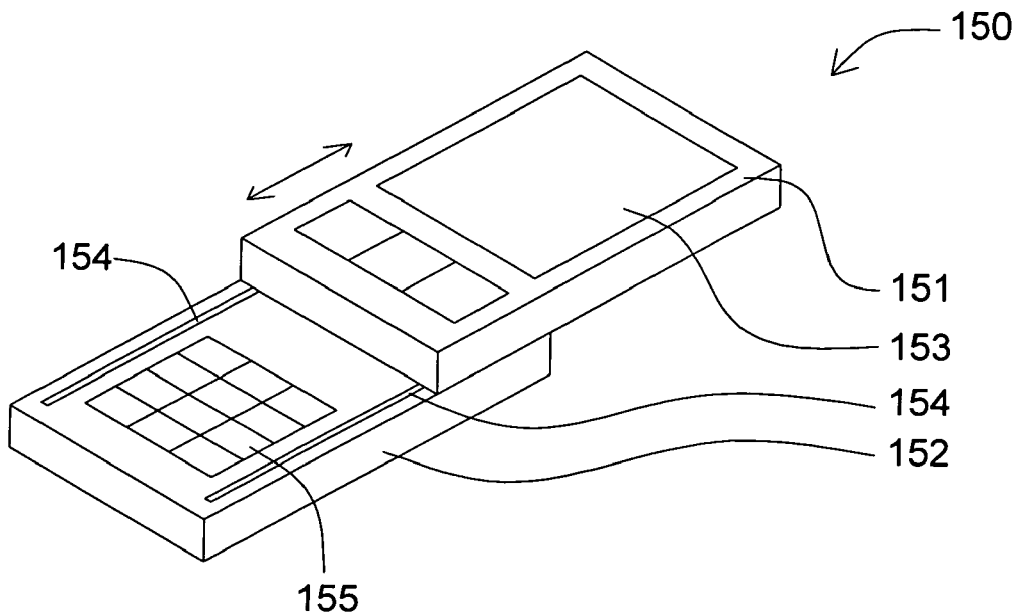
FIG. 1B is a schematic diagram showing another conventional electronic device.
Figure 2:
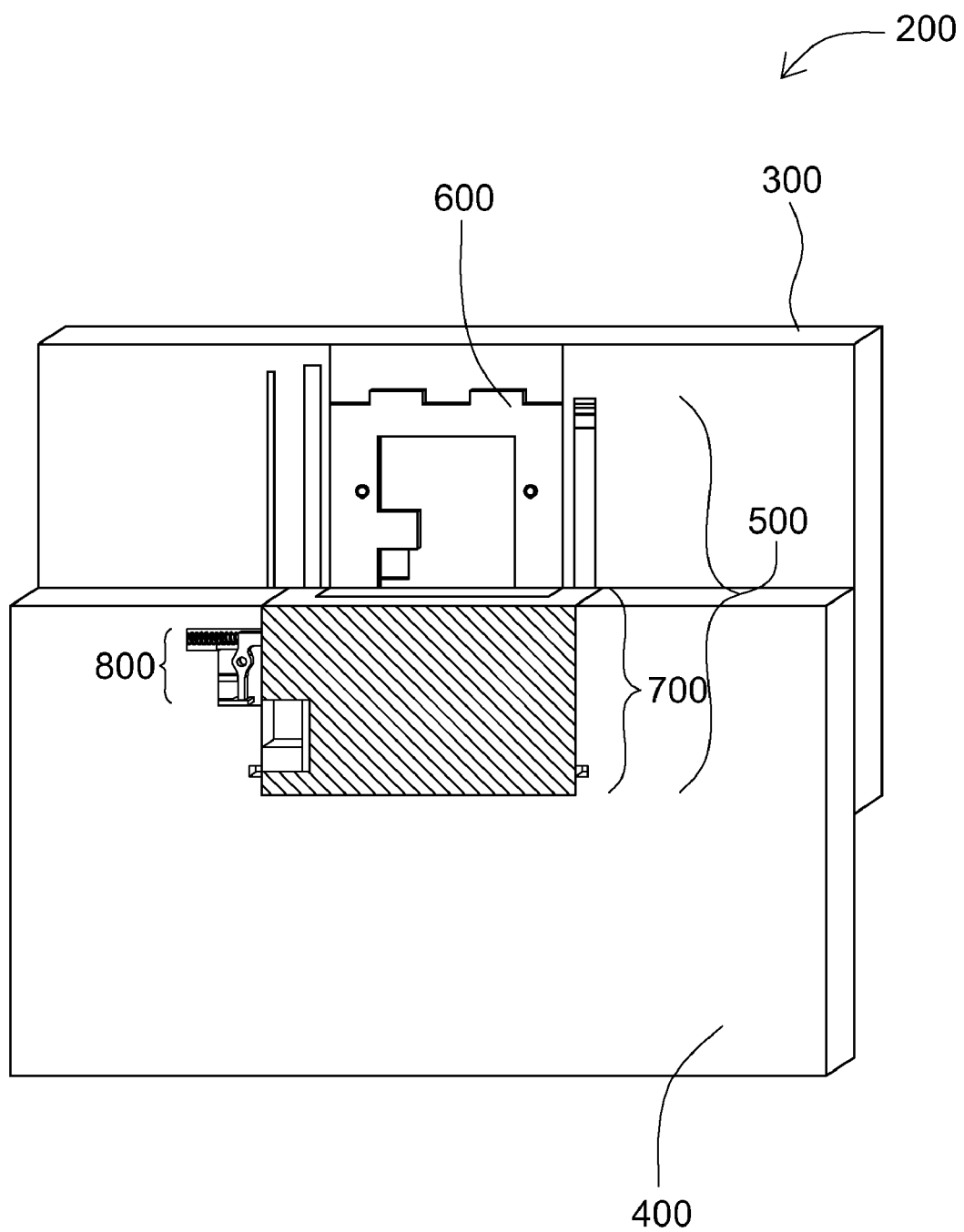
FIG. 2 is a bottom view showing an electronic device according to a preferred embodiment of the invention.

Please refer to FIG. 2 which is a bottom view showing an electronic device according to a preferred embodiment of the invention. The electronic device 200 according to this embodiment may be any information appliance such as a notebook, a smart phone, a personal digital assistant (PDA) and so on. This embodiment only takes the notebook for example.

The electronic device 200 includes a first casing 300, a second casing 400, and a flip apparatus 500. The flip apparatus 500 includes a sliding mechanism 600, a rotating mechanism 700, and an actuating element 800. The sliding mechanism 600 is disposed at the first casing 300 and is slidably connected to the second casing 400 to drive the first casing 300 to slide to a rotating position relative to the second casing 400.

Figure 3:
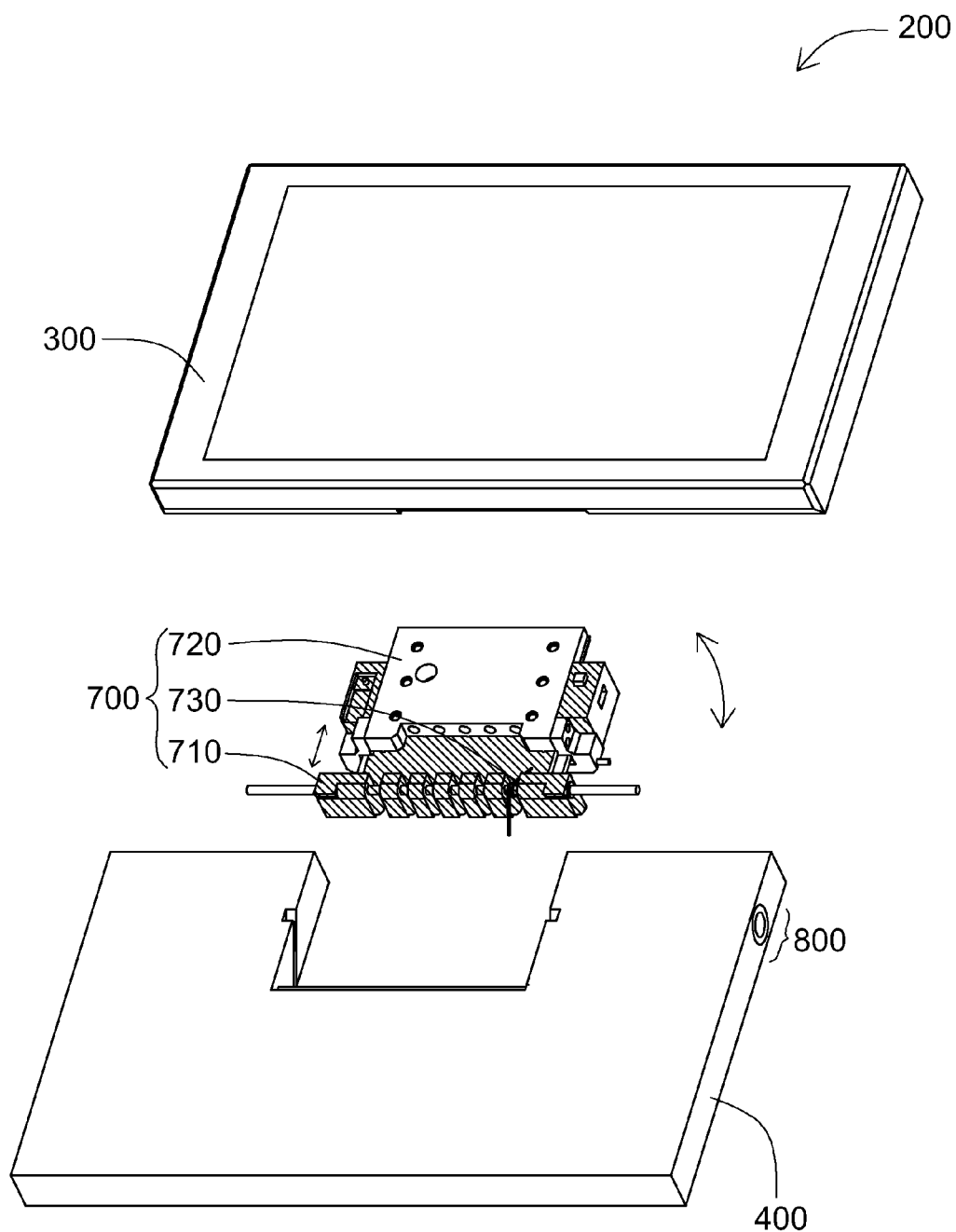
FIG. 3 is an exploded view showing the electronic device in FIG. 2.

Please refer to FIG. 3 which is an exploded view showing the electronic device in FIG. 2. The rotating mechanism 700 is pivotally connected to the second casing 400. The rotating mechanism 700 includes a rotating block 710, a moving block 720, and an elastic element 730. The rotating block 710 is pivotally connected to the second casing 400 and is fixed to the first casing 300. The moving block 720 is slidably provided at the rotating block 710 and is fixed to the sliding mechanism 600 (as shown in FIG. 2). The elastic element 730 is pivotally connected to the rotating block 710. The elastic element 730 has elastic potential energy and the rotating block 710 can be driven to rotate by releasing the elastic potential energy.

As shown in FIG. 2 and FIG. 3, the actuating element 800 is disposed at the second casing 400 and is used for restricting the rotating mechanism 700. When the first casing 300 slides to the rotating position relative to the second casing 400, the actuating element 800 can release the rotating mechanism 700 to release the elastic potential energy of the elastic element 730. Thus the rotating block 710 is driven to rotate and the moving block 720 is driven to slide relative to the rotating block 710, and then the first casing 300 is driven to rotate relative to the second casing 400.

Figure 4A:
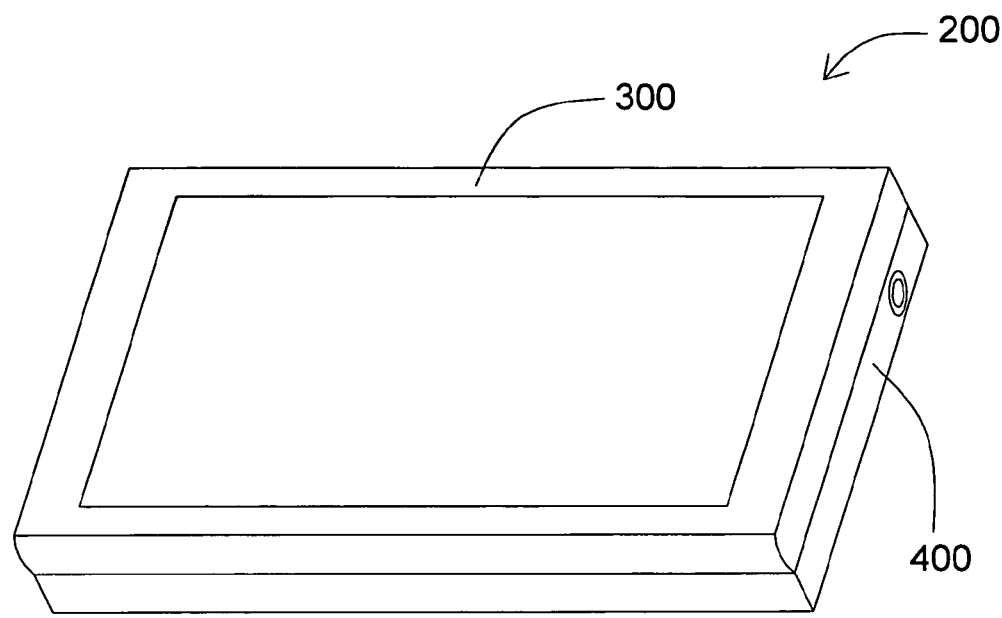
FIG. 4A is a schematic diagram showing a state of the electronic device in FIG. 2 before the first casing slides relative to the second casing.
Figure 4B:
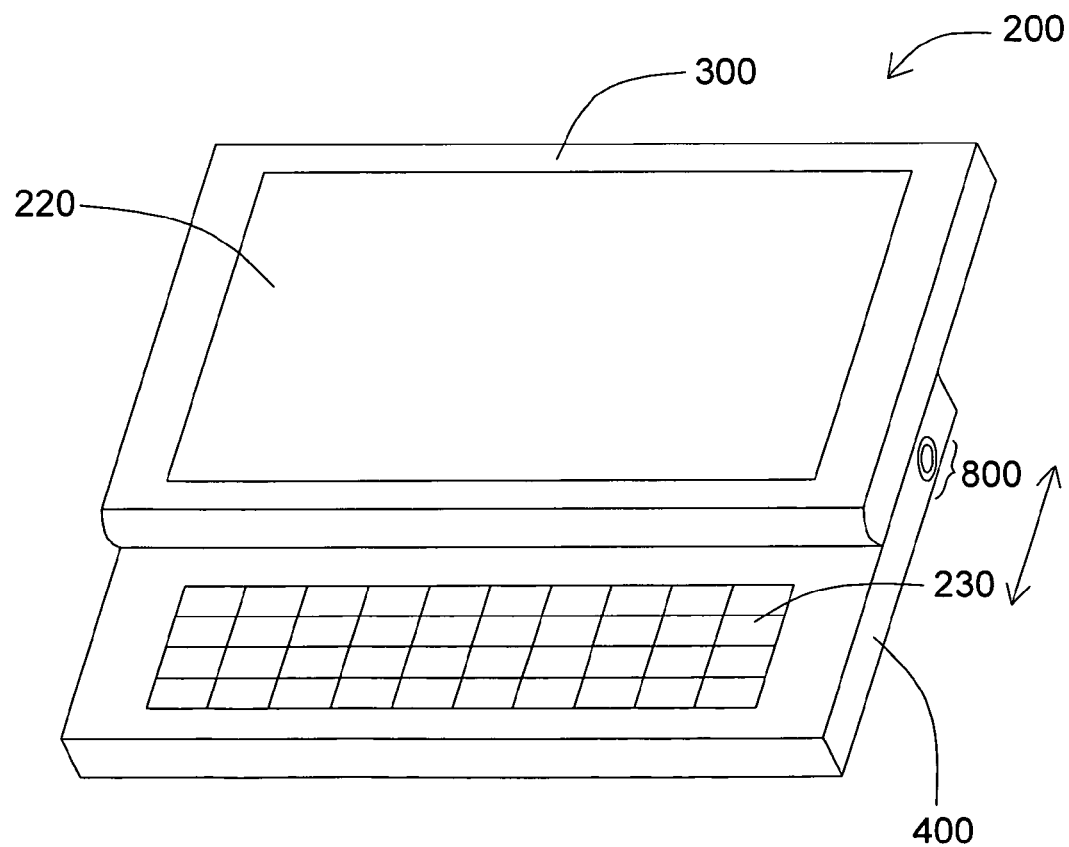
FIG. 4B is a schematic diagram showing a state of the electronic device in FIG. 2 during the first casing slides relative to the second casing to a rotating position.
Figure 4C:
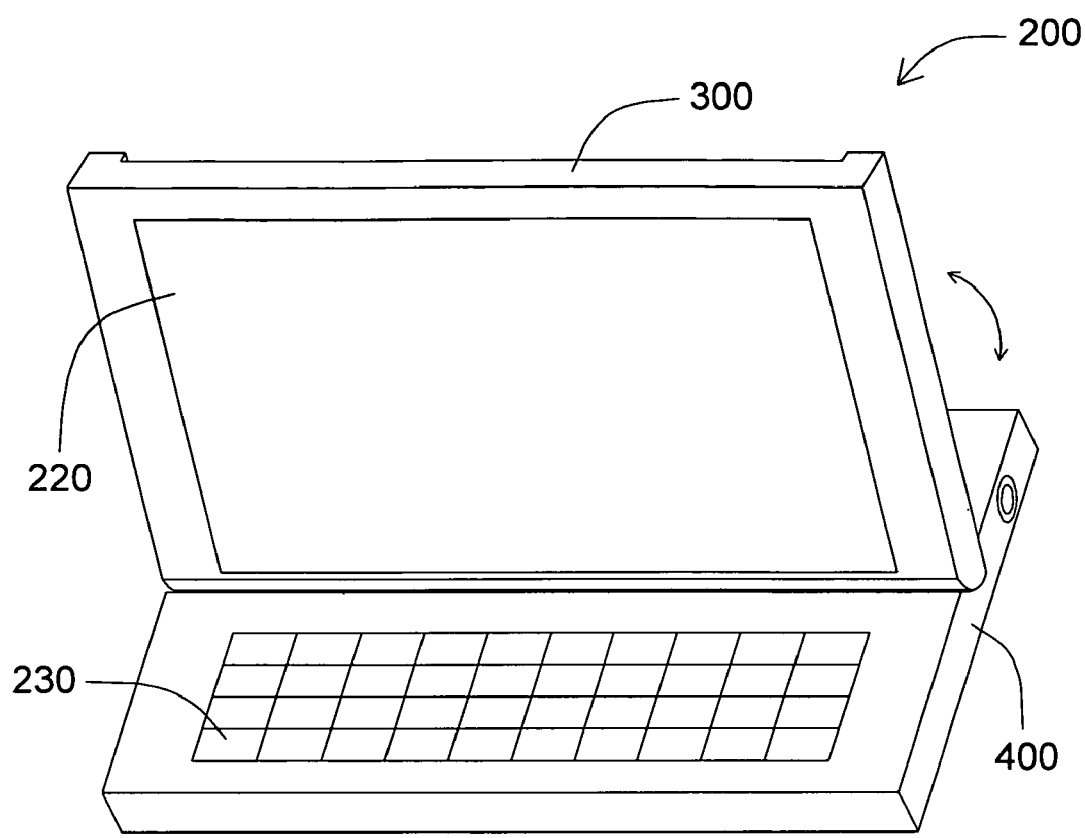
FIG. 4C is a schematic diagram showing a state of the electronic device in FIG. 2 after the first casing rotates relative to the second casing.

Please refer to FIG. 4A to FIG. 4C. FIG. 4A is a schematic diagram showing a state of the electronic device in FIG. 2 before the first casing slides relative to the second casing; FIG. 4B is a schematic diagram showing a state of the electronic device in FIG. 2 during the first casing slides relative to the second casing to a rotating position; FIG. 4C is a schematic diagram showing a state of the electronic device in FIG. 2 after the first casing rotates relative to the second casing. In FIG. 4A, the first casing 300 and the second casing 400 superpose. Thus the electronic device 200 can be easily carried or stored.

In FIG. 4B, the first casing 300 is in the rotating position. The first casing 300 slides from the position shown in FIG. 4A to the rotating position by the sliding mechanism 600 (as shown in FIG. 2). The actuating element 800 is used for restricting the rotating mechanism 700 (as shown in FIG. 2) to allow the first casing 300 to be positioned in the rotating position. Further, in this embodiment, a displaying element 220 is provided at the first casing 300, and a keyboard 230 is provided at the second casing 400. Thus when the first casing 300 is in the rotating position, a user can watch the displaying element 220 with others and use the keyboard 230 at the same time.

In FIG. 4C, there is an included angle between the first casing 300 and the second casing 400 to allow a user to watch the displaying element 220 from another angle and to use the keyboard 230 easily.

Figure 5:
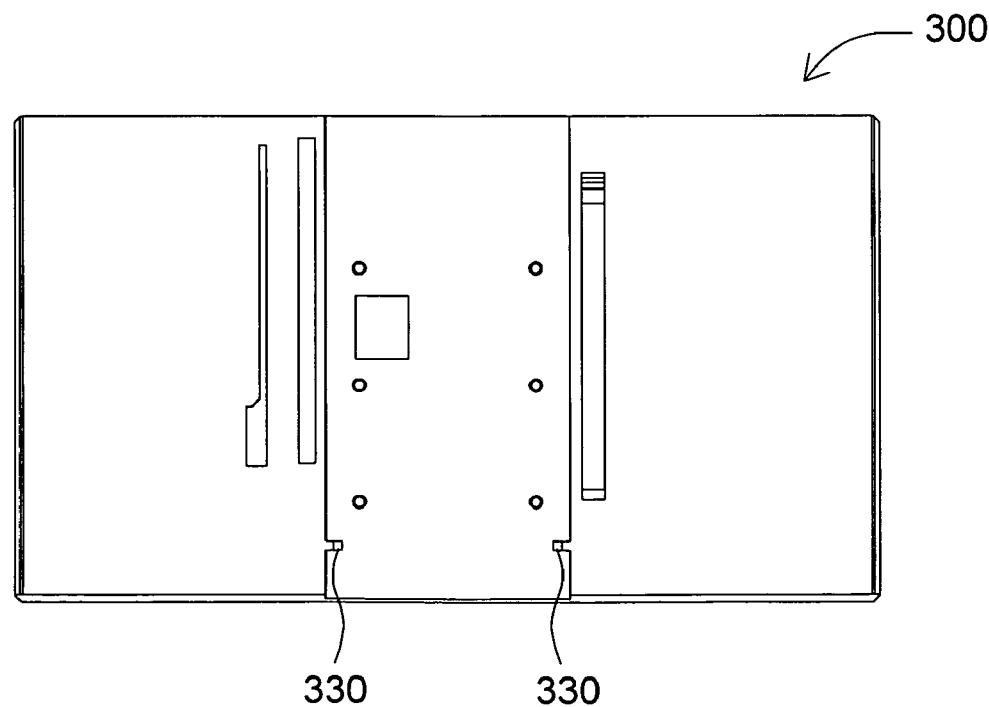
FIG. 5 is a bottom view showing the first casing in FIG. 2.

The electronic device 200 is further described hereinbelow. Please refer to FIG. 5 which is a bottom view showing the first casing in FIG. 2. The first casing 300 has two stoppers 330. When the first casing 300 slides relative to the second casing 400 (as shown in FIG. 2), the stoppers 330 are used for limiting the sliding track of the first casing 300 relative to the second casing 400 to allow the first casing 300 to be positioned in the rotating position as shown in FIG. 4B.

Figure 6A:
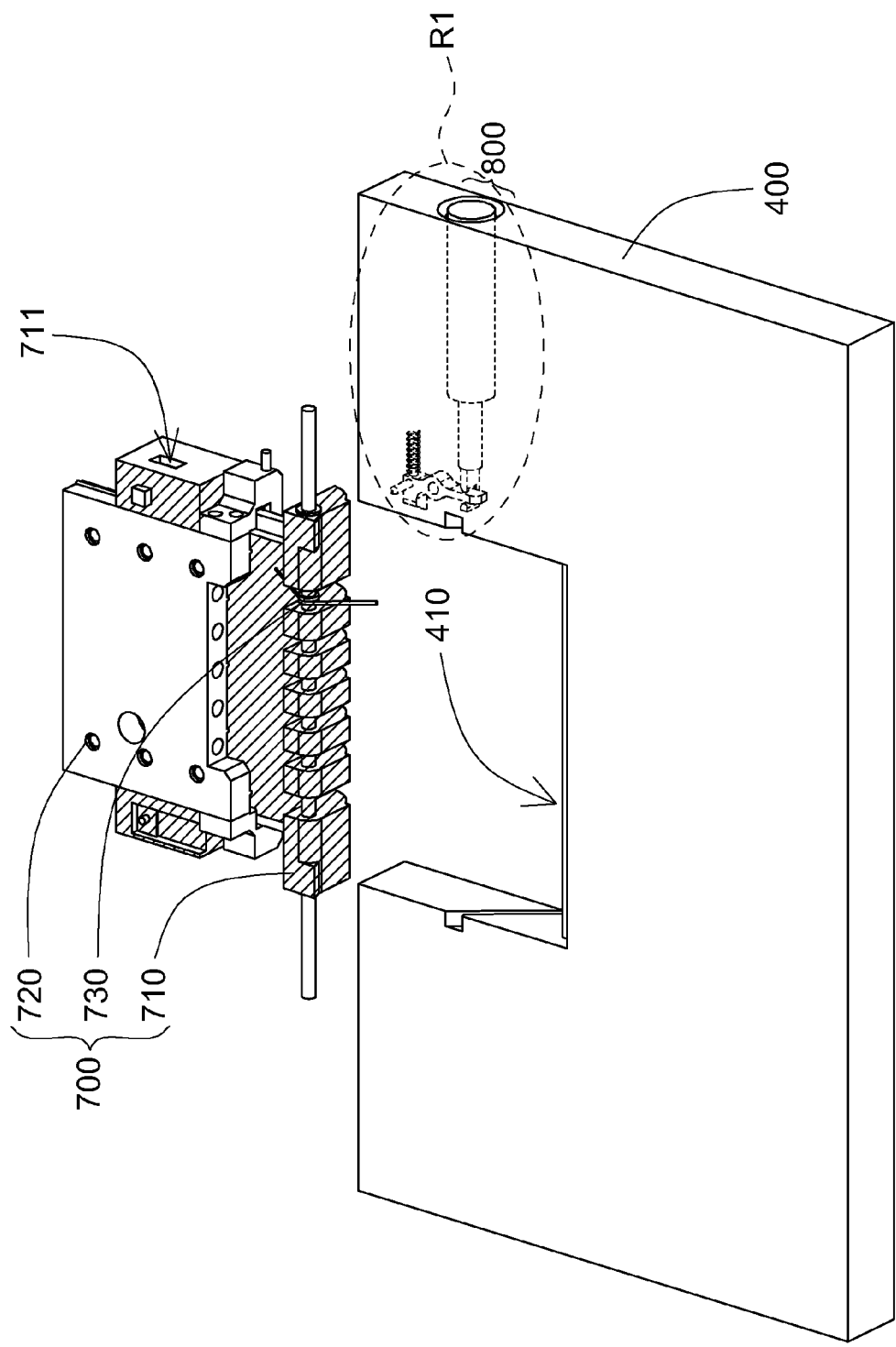
FIG. 6A is a schematic diagram showing part of the electronic device in FIG. 2.

Further, please refer to FIG. 6A which is a schematic diagram showing part of the electronic device in FIG. 2. FIG. 6A shows part of the element just to facilitate the description of the connecting and motion relationship between the elements, while it is not used for limiting the invention. The second casing 400 in FIG. 6A has a containing recess 410, and the rotating block 710 and the moving block 720 are contained in the containing recess 410. In this embodiment, the rotating block 710 has a slot 711. The actuating element 800 is provided within the range R1 and cooperates with the slot 711 to restrict the rotating mechanism 700.

Figure 6B:
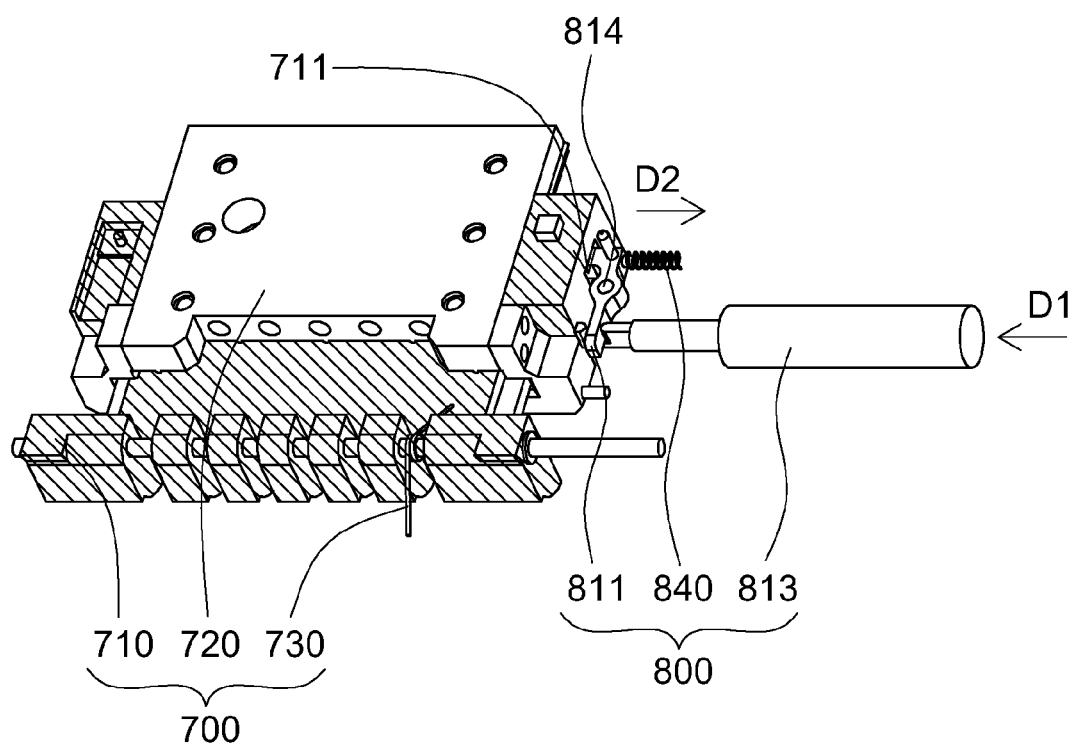
FIG. 6B is a schematic diagram showing a state of the electronic device in FIG. 6A during the actuating element and the slot of the rotating block cooperate with each other.

Please refer to FIG. 6B which is a schematic diagram showing a state of the electronic device in FIG. 6A during the actuating element and the slot of the rotating block cooperate with each other. The actuating element 800 includes a latch 811, a spring 840, and a button 813. The latch 811 is pivotally connected to the second casing 400 (as shown in FIG. 6A). The latch 811 can be locked in the slot 711 to limit the rotating mechanism 700, and therefore the first casing 300 (as shown in FIG. 2) is correspondingly restricted and is positioned in the rotating position (as shown in FIG. 4B).

One end of the spring 840 of the actuating element 800 is sleevedly connected to the latch 811, and the other end of the spring 840 is coupled to the second casing 400. The button 813 is coupled to one end of the latch 811. When the button 813 presses the latch 811 in a direction D1, the latch 811 rotates around a pivoting point 814. At this moment, the other end of the latch 811 moves in a direction D2 to release the rotating mechanism 700. After the latch 811 releases the rotating mechanism 700, the elastic potential energy of the spring 840 drives the latch 811 to be restored to an initial position.

Figure 7:
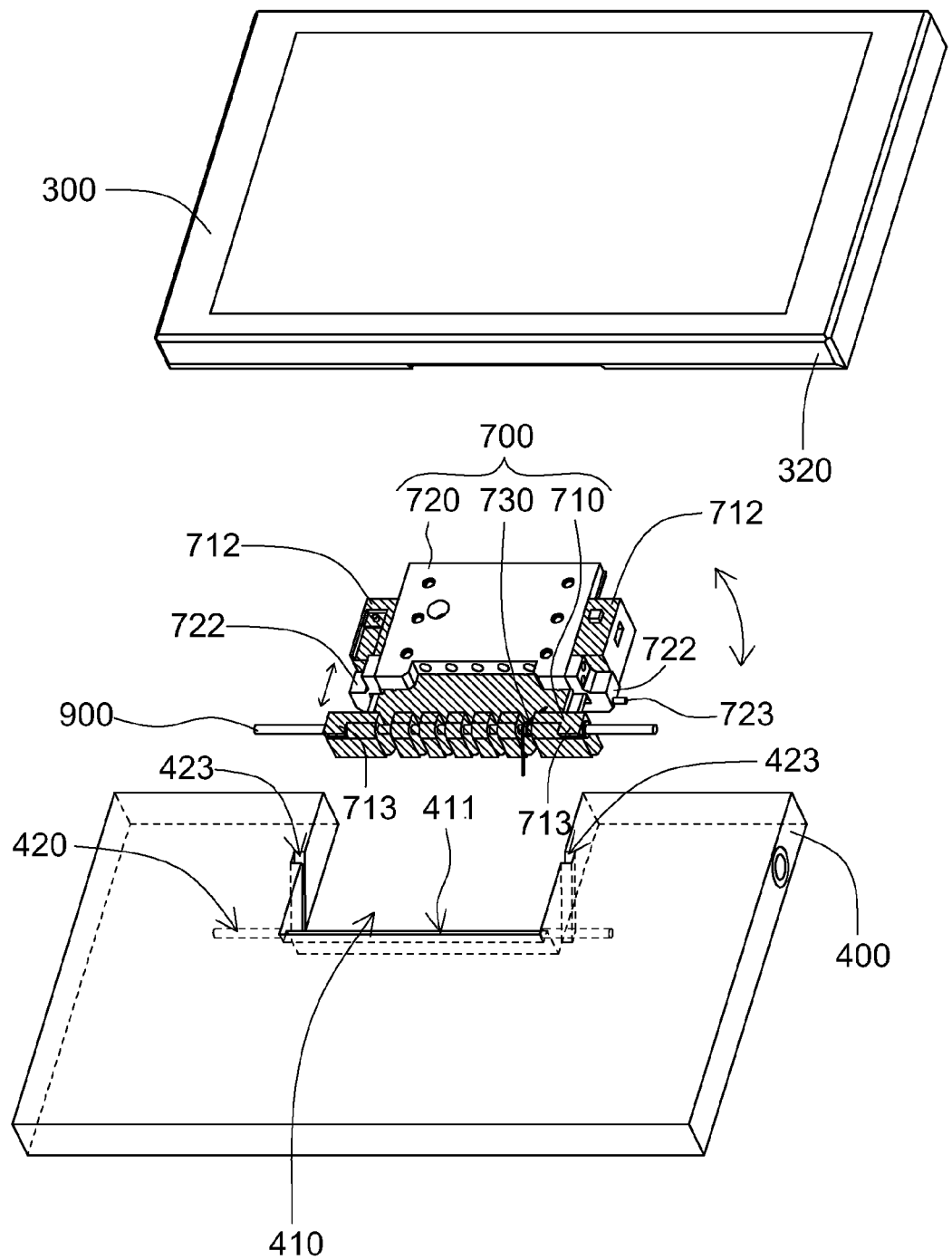
FIG. 7 is another schematic diagram showing part of the electronic device in FIG. 2.

Please refer to FIG. 7 which is another schematic diagram showing part of the electronic device in FIG. 2. In this embodiment, the elastic element 730 may be, for example, a torsion spring. After the actuating element 800 (as shown in FIG. 6B) releases the rotating mechanism 700, the elastic element 730 also releases the elastic potential energy to drive the rotating block 710 to rotate. In this embodiment, the flip apparatus 500 (as shown in FIG. 2) further includes a rotating shaft 900 disposed at the rotating block 710. The rotating block 710 is pivotally connected to the second casing 400 via the rotating shaft 900 and rotates around the rotating shaft 900.

The elastic potential energy of the elastic element 730 not only can drive the rotating block 710 to rotate but also can drive the moving block 720 to slide relative to the rotating block 710. In this embodiment, the rotating block 710 has at least one blocking element 712, and the moving block 720 has at least one protruding element 722. The position of the blocking element 712 corresponds to that of the protruding element 722 thereby to limit the sliding track of the moving block 720 relative to the rotating block 710. The second casing 400 according to this embodiment has at least one sloping guiding groove 423, and the protruding element 722 has at least one protruding post 723. The protruding post 723 is inserted into the sloping guiding groove 423. When the moving block 720 and the first casing 300 slide relative to the rotating block 710, the protruding post 723 moves along the sloping guiding groove 423.

The first casing 300 according to this embodiment has a smooth corner 320 adjacent to the second casing 400. Thus, when the first casing 300 rotates relative to the second casing 400, the first casing 300 contacts the second casing 400 via the smooth corner 320 to avoid affecting the rotation of the first casing 300. Further, the rotating block 710 has at least one raised element 713, and the containing recess 410 has a side wall 411. When the raised element 713 is against the side wall 411, the raised element 713 is used for limiting the rotating angle of the first casing 300 relative to the second casing 400.

In the flip apparatus and the electronic device using the same according to the above embodiments of the invention, the sliding mechanism and the rotating mechanism are respectively used to drive the first casing to slide and rotate relative to the second casing. When the first casing slides to the rotating position by the sliding mechanism, the actuating element is used for restricting the rotating mechanism. When the actuating element releases the rotating mechanism, the rotating mechanism drives the first casing to rotate relative to the second casing to form an angle between the first casing and the second casing. Thus the position of the first casing can be determined as required, and the position of the first casing relative to the second casing can be altered by the sliding mechanism and the rotating mechanism.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A flip apparatus disposed in an electronic device comprising a first casing and a second casing, the flip apparatus comprising:
    a sliding mechanism disposed at the first casing and slidably connected to the second casing to drive the first casing to slide to a rotating position relative to the second casing;
    a rotating mechanism pivotally connected to the second casing, wherein the rotating mechanism comprises:
    a rotating block pivotally connected to the second casing and fixed to the first casing;
    a moving block slidably provided at the rotating block and fixed to the sliding mechanism, wherein the moving block can slide relative to the rotating block; and
    an elastic element coupled to the rotating block, wherein the elastic element has elastic potential energy and the rotating block can be driven to rotate by releasing the elastic potential energy; and
    an actuating element disposed at the second casing and used for restricting the rotating mechanism, wherein when the first casing slides to the rotating position relative to the second casing, the actuating element can release the rotating mechanism to release the elastic potential energy of the elastic element, and then the rotating block is driven to rotate and the moving block is driven to slide relative to the rotating block thus to drive the first casing to rotate relative to the second casing.

2. The flip apparatus according to claim 1, wherein the rotating block has a blocking element, the moving block has a protruding element, and the position of the blocking element corresponds to that of the protruding element thereby to limit the sliding track of the moving block relative to the rotating block.

3. The flip apparatus according to claim 2, wherein the second casing has a sloping guiding groove, the protruding element has a protruding post inserted into the sloping guiding groove, and when the moving block and the first casing slide relative to the rotating block, the protruding post moves along the sloping guiding groove.

4. The flip apparatus according to claim 1, wherein the flip apparatus further comprises:
    a rotating shaft disposed at the rotating block which is pivotally connected to the second casing via the rotating shaft and rotates around the rotating shaft.

5. The flip apparatus according to claim 1, wherein the elastic element is a torsion spring.

6. The flip apparatus according to claim 1, wherein the second casing has a containing recess, and the rotating block and the moving block are contained in the containing recess before the first casing rotates relative to the second casing.

7. The flip apparatus according to claim 6, wherein the rotating block has a raised element, the containing recess has a side wall, and when the raised element is against the side wall, the raised element is used for limiting the rotating angle of the first casing relative to the second casing.

8. The flip apparatus according to claim 1, wherein the rotating block has a slot, and the actuating element comprises:
    a latch pivotally connected to the second casing and used for restricting the rotating mechanism from rotating by being locked in the slot; and
    a button coupled to the latch, wherein when the button presses the latch, the rotating mechanism is released.

9. The flip apparatus according to claim 8, wherein the actuating element further comprises:
    a spring, one end of which is connected to the latch and the other end of which is coupled to the second casing.

10. An electronic device comprising:
    a first casing;
    a second casing; and
    a flip apparatus comprising:
    a sliding mechanism disposed at the first casing and slidably connected to the second casing to drive the first casing to slide to a rotating position relative to the second casing;
    a rotating mechanism pivotally connected to the second casing, wherein the rotating mechanism comprises:
    a rotating block pivotally connected to the second casing and fixed to the first casing;
    a moving block slidably provided at the rotating block and fixed to the sliding mechanism, wherein the moving block can slide relative to the rotating block; and
    an elastic element coupled to the rotating block, wherein the elastic element has elastic potential energy and the rotating block can be driven to rotate by releasing the elastic potential energy; and
    an actuating element disposed at the second casing and used for restricting the rotating mechanism, wherein when the first casing slides to the rotating position relative to the second casing, the actuating element can release the rotating mechanism to release the elastic potential energy of the elastic element, and then the rotating block is driven to rotate and the moving block is driven to slide relative to the rotating block thus to drive the first casing to rotate relative to the second casing.

11. The electronic device according to claim 10, wherein the rotating block has a blocking element, the moving block has a protruding element, and the position of the blocking element corresponds to that of the protruding element thereby to limit the sliding track of the moving block relative to the rotating block.

12. The electronic device according to claim 11, wherein the second casing has a sloping guiding groove, the protruding element has a protruding post inserted into the sloping guiding groove, and when the moving block and the first casing slide relative to the rotating block, the protruding post moves along the sloping guiding groove.

13. The electronic device according to claim 10, wherein the flip apparatus further comprises:
a rotating shaft disposed at the rotating block which is pivotally connected to the second casing via the rotating shaft and rotates around the rotating shaft.

14. The electronic device according to claim 10, wherein the elastic element is a torsion spring.

15. The electronic device according to claim 10, wherein the second casing has a containing recess, and the rotating block and the moving block are contained in the containing recess before the first casing rotates relative to the second casing.

16. The electronic device according to claim 15, wherein the rotating block has a raised element, the containing recess has a side wall, and when the raised element is against the side wall, the raised element is used for limiting the rotating angle of the first casing relative to the second casing.

17. The electronic device according to claim 10, wherein the rotating block has a slot, and the actuating element comprises:
a latch pivotally connected to the second casing and used for restricting the rotating mechanism from rotating by being locked in the slot; and
a button coupled to the latch, wherein when the button presses the latch, the rotating mechanism is released.

18. The electronic device according to claim 17, wherein the actuating element further comprises:
a spring one end of which is connected to the latch and the other end of which is coupled to the second casing.

19. The electronic device according to claim 10, wherein the first casing has a stopper for limiting the sliding track of the first casing relative to the second casing.

20. The electronic device according to claim 10, wherein the first casing has a smooth corner adjacent to the second casing, and when the first casing rotates relative to the second casing, the first casing contacts the second casing via the smooth corner.

* * * * *